United States Patent [19]
Hoffman

[11] Patent Number: 6,061,518
[45] Date of Patent: May 9, 2000

[54] DATA PROCESSING SYSTEM AND METHOD FOR DEBUGGING A JAVASCRIPT PROGRAM

[75] Inventor: Richard Dale Hoffman, Austin, Tex.

[73] Assignee: International Business Machines Corporation, Armonk, N.Y.

[21] Appl. No.: 08/978,514

[22] Filed: Nov. 25, 1997

[51] Int. Cl.[7] .................................................... G06F 9/45
[52] U.S. Cl. ............................................. 395/704; 714/38
[58] Field of Search .............................. 395/183.14, 704; 714/38

[56] References Cited

U.S. PATENT DOCUMENTS

| | | | |
|---|---|---|---|
| 4,802,165 | 1/1989 | Ream | 395/183.14 |
| 4,989,132 | 1/1991 | Mellender et al. | 395/705 |
| 5,202,982 | 4/1993 | Gramlich et al. | 707/2 |
| 5,421,004 | 5/1995 | Carpenter et al. | 395/183.01 |
| 5,446,878 | 8/1995 | Royal | 395/180 |
| 5,621,886 | 4/1997 | Alpert et al. | 395/183.14 |
| 5,657,438 | 8/1997 | Wygodny et al. | 395/180 |
| 5,771,385 | 6/1998 | Harper | 395/704 |
| 5,809,248 | 9/1998 | Vidovic | 395/200.49 |
| 5,809,493 | 9/1998 | Ahamed et al. | 706/52 |
| 5,815,653 | 9/1998 | You et al. | 714/38 |
| 5,815,714 | 9/1998 | Shridhar et al. | 395/704 |
| 5,819,092 | 10/1998 | Ferguson et al. | 395/701 |
| 5,838,910 | 11/1998 | Domenikos et al. | 709/203 |
| 5,850,510 | 12/1998 | Fukushiro et al. | 395/183.14 |
| 5,901,315 | 5/1999 | Edwards et al. | 395/704 |
| 5,940,593 | 8/1999 | House et al. | 709/203 |
| 5,958,049 | 9/1999 | Mealey et al. | 713/1 |

OTHER PUBLICATIONS

"Full–Featured, Open Standards–Based Email", Netscape Communicator*]* Messenger, available via the Internet, Copyright 1997 Netscape Communications Corporation, this site powered by Netscape SuiteSpot servers, attached copy printed Oct. 7, 1997, pp. 1–2.

"Handbook: Mail, News, and Bookmarks", available via the Internet at info@netscape.com, Copyright 1994–1996 Netscape Communications Corporation, attached copy printed Oct. 7, 1997, pp. 1–13.

Samuel P. Harbison et al., Sec. 3.3 Definition and Replacement, *C A Reference Manual*, Third Edition, pp. 43–45.

(List continued on next page.)

*Primary Examiner*—Tariq R. Hafiz
*Assistant Examiner*—Brian Sattizahn
*Attorney, Agent, or Firm*—Winstead Sechrest & Minick P.C.

[57] ABSTRACT

An efficient mechanism for debugging JavaScript programs is implemented to provide functions that allow a software developer to gain more information and to have more control when debugging a software program. Debugging tools are implemented to allow the software developer to control the contents of a JavaScript client object directly during the debugging operation and, therefore, to have greater control over and to know the contents of the client object at a specific point in time during execution of the program. Additionally, a data processing system and methodology are implemented to allow debugging functions and results generated therefrom to be output to a temporary file based on a current client's Internet Protocol address, rather than to a display screen or a current applet device of the client. An additional variable is utilized to indicate whether the information obtained during a debug procedure should be displayed on a current page or should be output to a temporary file based on the current client's Internet Protocol address to obtain information about errors within a software program, even when printing such information during program execution is not possible. Furthermore, a data processing and methodology are implemented to selectively enable and disable debug statements and software code. By providing such selective enablement, the use of debugging statements in the software code may be selectively enabled and disabled without modifying previously compiled code.

11 Claims, 4 Drawing Sheets

OTHER PUBLICATIONS

"Understanding Client Configuration", available via the Internet at wysiwyg://content.124/http://developer.n...com/library/documentation/ant/config.html, Copyright 1997 Netscape Communications Corporation, attached copy printed Jun. 16, 1997, pp. 1–7.

Andrew Wooldridge et al., Chapter 24, *Using JavaScript—Second Edition*, Copyright 1997, pp. 637–655.

"Finally, JavaScript Development Tools; Microsoft Offers Script Debugger, Acadia has an Editor"; InformationWeek; pp. A03, Prompt [online]. Retrieved from STN International. Acession No. 97:91442, Feb. 1997.

"NETSCAPE: Netscape previews Netscape Visual JavaScript"; M2 Presswire. NLDB [online]. Retrieved from STN International. Accession No. 97:132692, Apr. 1997.

"Netscape Communication's Ontological Fantasy—Crossware"; Computergram International. NLDB [online]. Retrieved from STN International. Accession No. 97:213573, Jun. 1997.

"Getting Started with Netscape JavaScript Debugger" Netscape Communications; pp. 1–26. [online]. Retrieved from the Internet, Dec. 1997.

Garrett, D.; Potts, A.; Friedel, Jr., D.; "Visual Cafe Programming"; Coriolis Group Books; Chapter 10, pp. 241–258, May 1997.

Trudeau, J.; "Mastering CodeWarrior for Windows 95/NT—The Official Guide"; Sybex; Chapter 8, "Viewing and Changing Data" section, pp. 367–378, Feb. 1997.

DATA PROCESSING SYSTEM AND METHOD FOR DEBUGGING A JAVASCRIPT PROGRAM

CROSS-REFERENCE TO RELATED APPLICATIONS

The present invention is related to U.S. patent application Ser. No. 08/976,463 entitled "A Data Processing System and Method for Debugging JavaScript", by Richard D. Hoffman, which is hereby incorporated by reference herein.

COPYRIGHT NOTIFICATION

A portion of the disclosure of this document contains material which is subject to copyright protection. A copyright owner has no objection to the facsimile reproduction by anyone of the patent document or the patent disclosure, as it appears in the Patent and Trademark Office patent file or records, but otherwise reserves all copyright works whatsoever.

TECHNICAL FIELD

The present invention relates in general to an interpretive programming language, and more particularly, to a data processing system and method for debugging a JavaScript program.

BACKGROUND INFORMATION

During development of a new software program, the resulting program may be modified and reviewed for any errors, or "bugs." This process, commonly referred to as "debugging," is often time consuming and requires skill and patience of the programmer attempting to provide a functional software program. Many debugging tools and techniques have been developed to help alleviate the difficulties faced by the developer.

For example, a common debugging techniques inserts "print statements" throughout the software program in an attempt to locate the source of an error. While the random insertion of print statements in a faulty program allows the programmer to take initial steps to locate an error, the use of such print statements is inefficient and often ineffective. For example, print statements are typically inserted into a software program on a "trial and error" basis. Thus, the programmer must either use a separate methodology for determining an initial location of an error in a program, or scatter a large number of print statements throughout the program to glean some clues from the insertion thereof. Additionally, the more subtle the problem in the software program, the less likely the programmer is to choose the proper location for insertion of the print statements. Thus, the use of print statements to debug software programs may result in the inefficient use of programming resources.

The problems associated with debugging traditional software programs are exacerbated by the debug deficiencies found in many newer programming languages. For example, JavaScript is a new programming language that has been developed for use on the communication network known as the Internet. JavaScript does not provide a great number of debugging tools and, therefore, debugging a JavaScript program becomes an even more challenging debugging task. For instance, should the print statement debug process be used and ad hoc statements utilized to print out information to attempt to locate errors, such statements must be provided in Hypertext Markup Language (HTML). Additionally, the HTML code must be appropriately configured for display on the programmer's display. Thus, HTML code including debugging information as well as control information (such as new lines, separators and the like) for displaying the statements, must be provided to implement the concepts embodied in print statement debugging techniques.

The problems associated with executing print-type statements within a JavaScript program are further compounded by the programmers' requirements the values of variables used in the software program be provided at a moment before the error occurs during execution of the software program. It should be noted that variables may be objects in JavaScript. For clarity, an example will be provided to define the difference between objects and variables. In one instance, an object may be called a person. The person object might then have variables and objects associated therewith, such as the person's name, phone number, address, and salary history. The person's name might be an object having the first, middle, and last names of the person identified as variables. Additionally, the address might be an object, where the street number, city and zip code are each a variable included within the address object.

In most programming languages, a programmer knows the contents of an object because the programmer created the object. For example, C++ is an object-oriented software programming language, wherein all objects are defined before the program is written and these definitions may subsequently be used during the debugging process. However, JavaScript is an interpretive programming language that allows the programmer to describe objects dynamically. Thus, JavaScript allows a programmer to have the capability to add new properties to objects as the program is executed. Therefore, in situations in which a software program has been written by more than one person, some objects may include unanticipated properties. While this JavaScript capability provides the flexibility desired for interactive Internet usage, a programmer performing a debugging operation is unable to actually know characteristics of objects that are used within the JavaScript program until execution of that program. Therefore, if during the debugging process, the programmer desires to determine values of the variables or objects used during execution of the JavaScript program, the programmer currently has no method for doing so.

Furthermore, even when data is retrieved to provide a value for the variables or objects used during execution of the JavaScript program, that data often includes codes for information that are not discernable to an external user or programmer. Such confusing codes often hinder a programmer's ability to effectively debug a software program, where the programmer does not know or must manually translate the received codes into a more understandable description of the information. Furthermore, given that JavaScript is a scripting language that is supported by multiple platforms, local operating systems must be able to evaluate the received codes to correctly utilize the information transferred therewith.

Additionally, even when debugging statements are utilized to evaluate and correct faulty software code, it may often be desirable to disable the debugging statements in the production software code so that they can subsequently be enabled to analyze problems. However, should the software code already be sold to a client such that the debugging statements may not be enabled, such debugging statements are not useful. In such situations, it is not possible for the programmer to enable the statements by changing a hard-coded variable in the compiled code. Additionally, even if it is possible to enable the statements, current debugging techniques do not allow a programmer to selectively enable only certain portions of a code section being debugged.

Additionally, even should such debugging statements be enabled after the code is produced and sold to a client, service personnel are typically unable to control the contents of the JavaScript client object directly. Thus, the service personnel do not have a vital and effective tool of viewing the contents of the client object at will as JavaScript does not directly provide these capabilities. This limitation severely restricts the ability of support personnel to help a user of the software code to implement that code within their system. Typically, the users of the software code is forced to either obtain different code or debug the code on their own.

Therefore, a need exists for a method and data processing system for debugging interpretive programming languages, such as JavaScript, in a manner that provides programmers with the information required to effectively debug the program in a timely and efficient manner. Additionally, the data processing system and method for debugging the JavaScript program should be implemented in a manner that allows service personnel supporting the JavaScript application to aid a client in debugging the program on the client's system without requiring service personnel to travel to the client's location. Furthermore, there exists a need for a mechanism that provides information about an object or variable in JavaScript and in other interpretive programming language programs. Each of the aforementioned needs should be addressed with a device and methodology that provides more information with less programming requirements and that is easily enabled and disabled.

SUMMARY OF THE INVENTION

The previously mentioned needs are fulfilled with the present invention. Accordingly, there is provided, in a first form, a method for debugging a program written in an object-oriented programming language and implemented by a user. The method includes the step of accessing an object of the program using a first request protocol. The first request protocol specifies an uniform resource locator. The method also includes the steps of retrieving a first characteristic of the object in response to the first request protocol and providing the first characteristic of the object to the user.

Additionally, there is provided, in a second form, a computer program product in a computer readable medium for debugging a software program. The computer program product includes a device for receiving a request in a first format. The request identifies a uniform resource locator of a client implementing the software program. The computer program product also includes a device for retrieving a first characteristic of the client in response to the request and a device for displaying the first characteristic of the client.

Furthermore, there is included, in a third form, a first data processing system. The first data processing system includes an input device for receiving a request in a first format. The request identifies a uniform resource locator of a second data processing system. The first data processing system also includes a central processing unit for parsing the request to determine a property of the second data processing system and for selectively modifying a value of a variable in a software program accessible by the second data processing system.

As well, there is provided, in a fourth form, a method for executing a software program. The method includes the steps of retrieving an output variable from a first memory, executing the software program to generate an output, and selectively storing the output in a second memory when the output variable has a first value. The method also includes the step of selectively displaying the output on a display device when the output variable has a second value.

As well, there is provided, in a fifth form, a computer program product in a computer readable medium for debugging a software program. The computer program product includes a device for retrieving an output variable from a first memory and a device for executing the software program to generate an output. The computer program product also includes a device for selectively storing the output in a second memory when the output variable has a first value and a device for selectively displaying the output on a display device when the output variable has a second value.

Furthermore, there is provided, in a sixth form, a data processing system. The data processing system includes a first memory for storing an output variable and a central processing unit connected to the first memory for retrieving the output variable and for executing the software program to generate an output. The data processing system also includes a second memory for selectively storing the output when the output variable has a first value. The second memory is connected to the central processing unit for selectively receiving the output. The data processing system also includes a display device for selectively displaying the output when the output variable has a second value. The display device is connected to the central processing unit for selectively receiving the output.

Additionally, there is provided, in a seventh form, a method for selectively enabling sections of a software program. The method includes the step of receiving a first command to enable a first section of the software program. The first command is in a JavaScript programming language. The method also includes the steps of determining when the first section of the software program is capable of being enabled and selectively enabling execution of the first section of the software program.

Additionally, there is provided, in an eighth form, a method for selectively disabling sections of a software program. The method includes the step of receiving a first command to disable a first section of the software program. The first section of the software program corresponds to a first mode variable and the first command is in a JavaScript programming language. The method also includes the steps of selectively disabling execution of the first section of the software program in response to the first command and modifying a value of the first mode variable during execution of a subsequent section of the software program.

Furthermore, there is provided, in a ninth form, a computer program product in a computer readable medium for debugging a software program. The computer program product includes a device for receiving a first command to enable a first section of the software program. The first command is in a JavaScript programming language. The computer program product also includes a device for determining when the first section of the software program is capable of being enabled and a device for selectively enabling execution of the first section of the software program.

Additionally, there is provided, in a tenth form, a computer program product in a computer readable medium for selectively disabling sections of a software program. The computer program product includes a device for receiving a first command to disable a first section of the software program. The first section of the software program corresponds to a first mode variable and the first command is in a JavaScript programming language. The computer program product also includes a device for selectively disabling execution of the first section of the software program in response to the first command and a device for modifying a value of the first mode variable during execution of a subsequent section of the software program.

Furthermore, there is provided, in a eleventh form, a data processing system capable of selectively enabling sections of a software program. The data processing system includes an input device for receiving a first command to enable a first section of the software program. The first command is in a JavaScript programming language. The data processing system also includes a central processing unit connected to the input device for receiving the first command. The central processing unit determining when the first section of the software program is capable of being enabled and selectively enabling execution of the first section of the software program in response to the first command.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
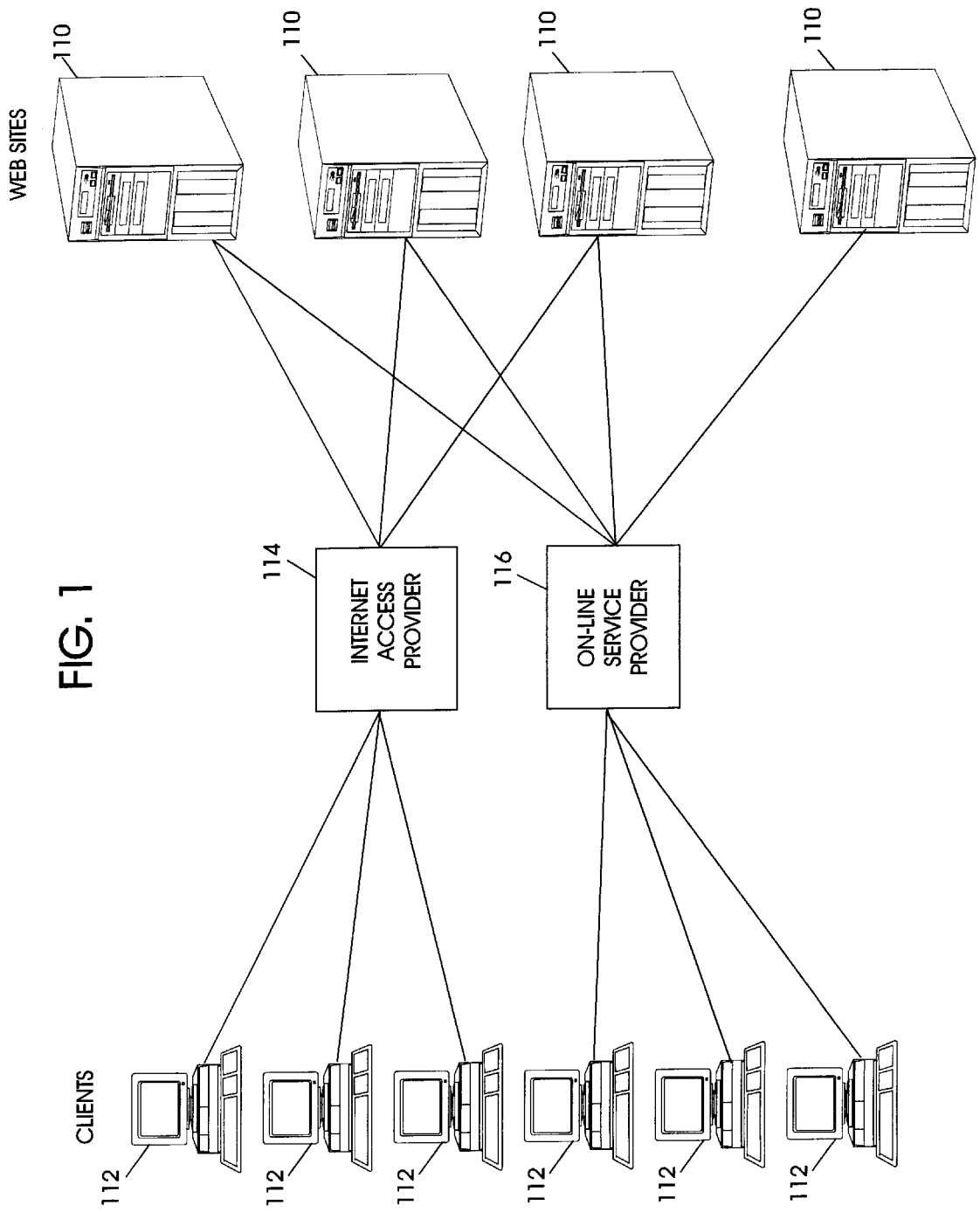
FIG. 1 illustrates, in block diagram form, a communication network in which one embodiment of the present invention may be implemented.

The present invention provides a more efficient mechanism for debugging JavaScript programs by providing functions that allow a program developer to gain more information and have more control over the debugging of the software program. To obtain such information, the debugging tools implemented by the present invention allow a software developer debugging a program to control the contents of the JavaScript client object directly during the debugging operation. This allows the software developer to have greater control over and to know the contents of the client objects at a specific point in time during execution of the program. This information is often critical to successfully debugging a software program. However, JavaScript does not provide generally such capability and, therefore, without the implementation of the present invention, debugging would be significantly more difficult.

Additionally, the present invention implements a data processing system and methodology that allows debugging functions and the results generated therefrom to be output to a temporary file based on a current client's Internet Protocol (IP) address, rather than to a display screen or current output device. To implement this portion of the present invention, an additional variable, debug_output, is utilized to indicate whether the information obtained during a debug procedure should be displayed on a current page or should be output to a temporary file based on the current client's IP address. This option allows a person performing a debugging operation to obtain information about errors within a software program, even when printing such information during program execution is not possible.

Furthermore, the present invention implements a method for selectively enabling and disabling debug statements in software code. By providing such selective enablement, the use of debugging statements in the software code may be selectively enabled and disabled without modifying previously compiled code. Specifically, the present invention implements a debug_start and debug_end statement to define debugging sections in JavaScript software code. Both the debug_start and debug_end statements have a corresponding "debugging level." When a section of a program to be evaluated is enabled, all debug statements within the section whose level is less than or equal to that of the section will be enabled. As well, sections associated with the debug_start and debug_end statements may be enabled by setting variables in a client cookie stored on the client's computer. By using the client cookie, several users may simultaneously use the same application with the debugging instructions enabled or disabled on an individual basis. Furthermore, such debug sections may be nested in some applications. Implementation of each of the functions described above will subsequently be provided in greater detail.

Each of the aforementioned functions performed by the present invention will subsequently be described in greater detail. It should be noted that in the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. During a description of the implementation of the invention, the terms "assert" and "negate" and various grammatical forms thereof, are used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state.

Refer now to the drawings wherein depicted elements are not necessarily shown to scale and wherein like or similar elements are designated by the same reference numeral through the several views.

FIG. 1 illustrates a communication network based on a client-server model typically utilized in the Internet. The subsequent discussion and description of FIG. 1 are provided to illustrate the Internet environment utilized by the present invention.

Conceptually, the Internet comprises a large network of "servers" 110 that are accessible by "clients" 112. Each of the plurality of clients 112 is typically a user of a personal computer. Clients 112 access the Internet through some private Internet access provider 114 (such as Internet America™) or an on-line service provider 116 (such as America On-Line™, AT&T WorldNet™, and the like). Additionally, clients 112 may access the web servers via a direct connection (not illustrated in some embodiments of the present invention). Each of clients 112 may run on a "browser," which is a known software tool used to access the servers (110) via the access providers (114 and 116). Each server 110 selectively operates a "web site" that supports files in the form of documents and pages. A network path to a server is identified by a uniform resource locator (URL) having a known syntax for defining a network connection.

As previously mentioned, the World Wide Web is a collection of servers on the Internet that utilizes Hypertext Transfer Protocol (HTTP). HTTP is a known application protocol that provides users access to files using a standard page description language known as Hypertext Markup Language (HTML). It should be noted that the files may be in different formats, such as text, graphics, images, sound, video, and the like. HTML provides basic document formatting and allows the developer to specify "links" to other servers or files. Use of an HTML-compliant browser involves specification of a link via the URL. Upon such specification, one of the clients 112 may make TCP/IP request to one of plurality of servers 110 identified in the link and receive a web page (specifically, a document formatted according to HTML) in return.

Figure 2:
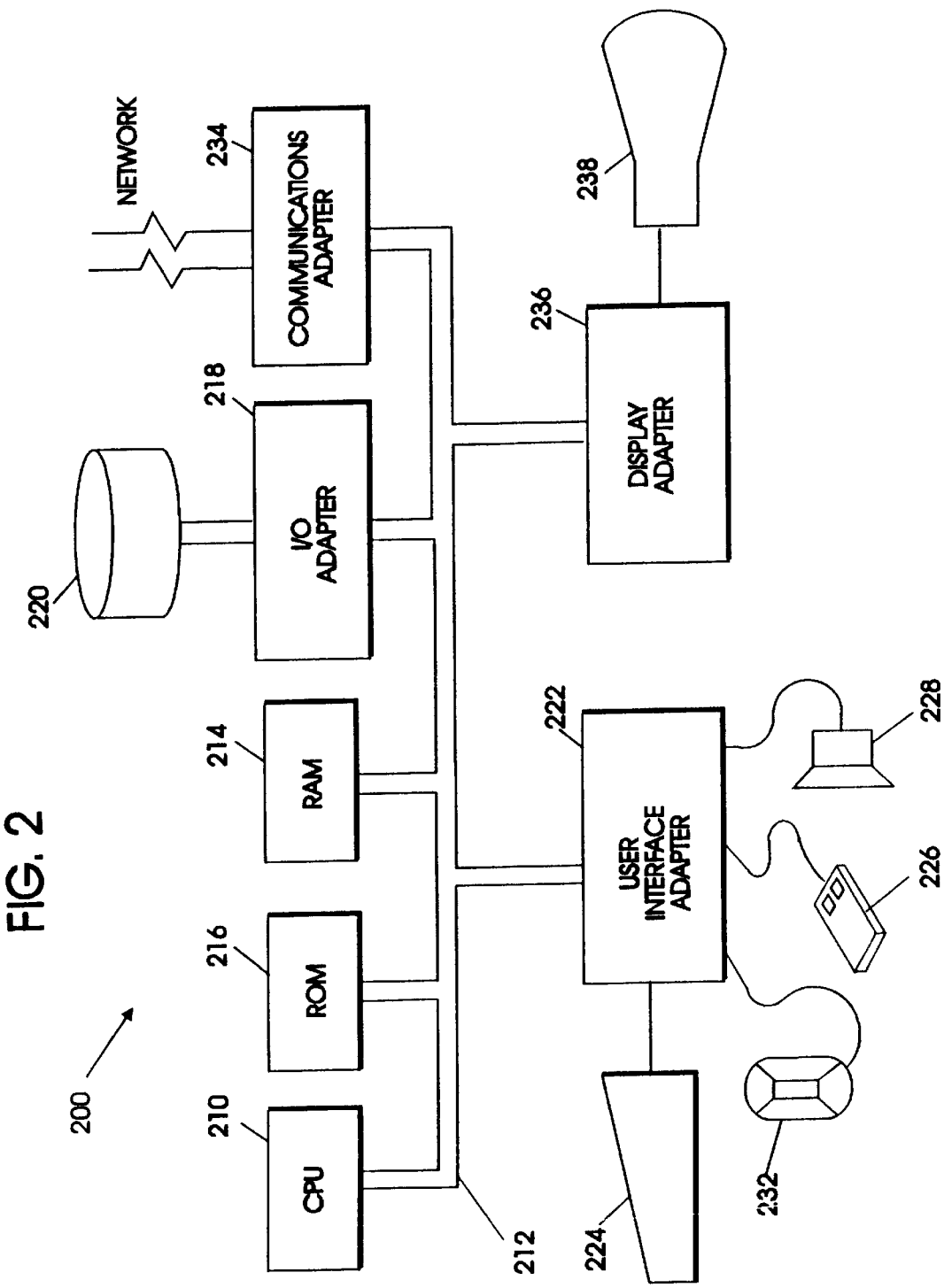
FIG. 2 illustrates, in block diagram form, a data processing system implemented in accordance with one embodiment of the present invention.

Referring first to FIG. 2, an example is illustrated of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual," 1994, IBM Corporation, which is hereby incorporated herein by reference. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Description of Operation

Assume that a software developer has written a program in JavaScript, has debugged that program, and has shipped that program to an external user. If the external user identifies a fault in the JavaScript program, support personnel or the software developer may desire to perform "debug" operations to help the user of the software identify a point at which the software program generates an erroneous result or a point at which the JavaScript application and the user's system are not compatible. The present invention proposes several tools for enabling the support personnel or software developer to more easily implement debugging operations in a JavaScript program.

Config.html Page

A first debugging technique implemented by the present invention generates a support web page that may be accessed by a request including a URL and the suffix "config.html". This request will hereinafter be referred to as a config.html request. When a user inputs a config.html request, a display device used by the user displays the current client Internet Protocol (IP) address, agent, protocol and transmission method and displays the current contents of the client object in one embodiment of the present invention. It should be noted that other information may also be displayed in alternate embodiments of the present invention. Additionally, the config.html request allows new client properties to be dynamically set based on the invoking request.

The invoking request may be sent from the user or software developer's browser and typically has the form:

http:H//(UniformResourceLocator)/config.html

When a JavaScript application receives that request in one embodiment of the present invention, a web page is displayed to provide information about the client using the JavaScript application found at the requested Uniform Resource Locator (URL). For example, if a user or software developer typed a request having the form:

http://mydomain.com/MYAPP/config.html,
the following information would be displayed to the user:

ip=9.123.23.45
agent=Mozilla 3.0
protocol=HTTP 2.0
method=POST

As stated above, by typing in a client URL with the suffix "config.html," the current IP address, agent, protocol and transmission method of the client are displayed on the client's display device, or provided to the client in another desired manner.

Additionally, the config.html request of the present invention allows new client object properties to be set using an invoking request. For example, should a user or software developer input the following request via their browser, the contents of a JavaScript client object may be controlled directly in a manner not provided for by the JavaScript programming language. A request to provide such control will have the form:

http://server.domain/application/config.html?x=2

It should be noted that the command "x=2" is modifiable by the user or software developer inputting the request and merely reflects a value to which of a client object is to be modified. Thus, the present invention allows the client or the software developer to view the contents of the client object at will, as well as to modify the contents of the JavaScript client object directly. To illustrate how the contents of the JavaScript client object are directly controlled, consider the following example in which a user or software developer might input the following invoking request:

http://mydomain.com/MYAPP/config.html?x=2&y=3.

This request may result in a display of the following information in one embodiment to the present invention:

ip=9.123.23.45
agent=Mozilla 3.0
protocol=HTTP 2.0
method=POST
client.x="2"
client.y="3"

The foregoing has provided a general description of operation of the config.html page implemented by the present invention. Subsequently, a more detailed description of operation of the present invention will be provided.

Figure 6:
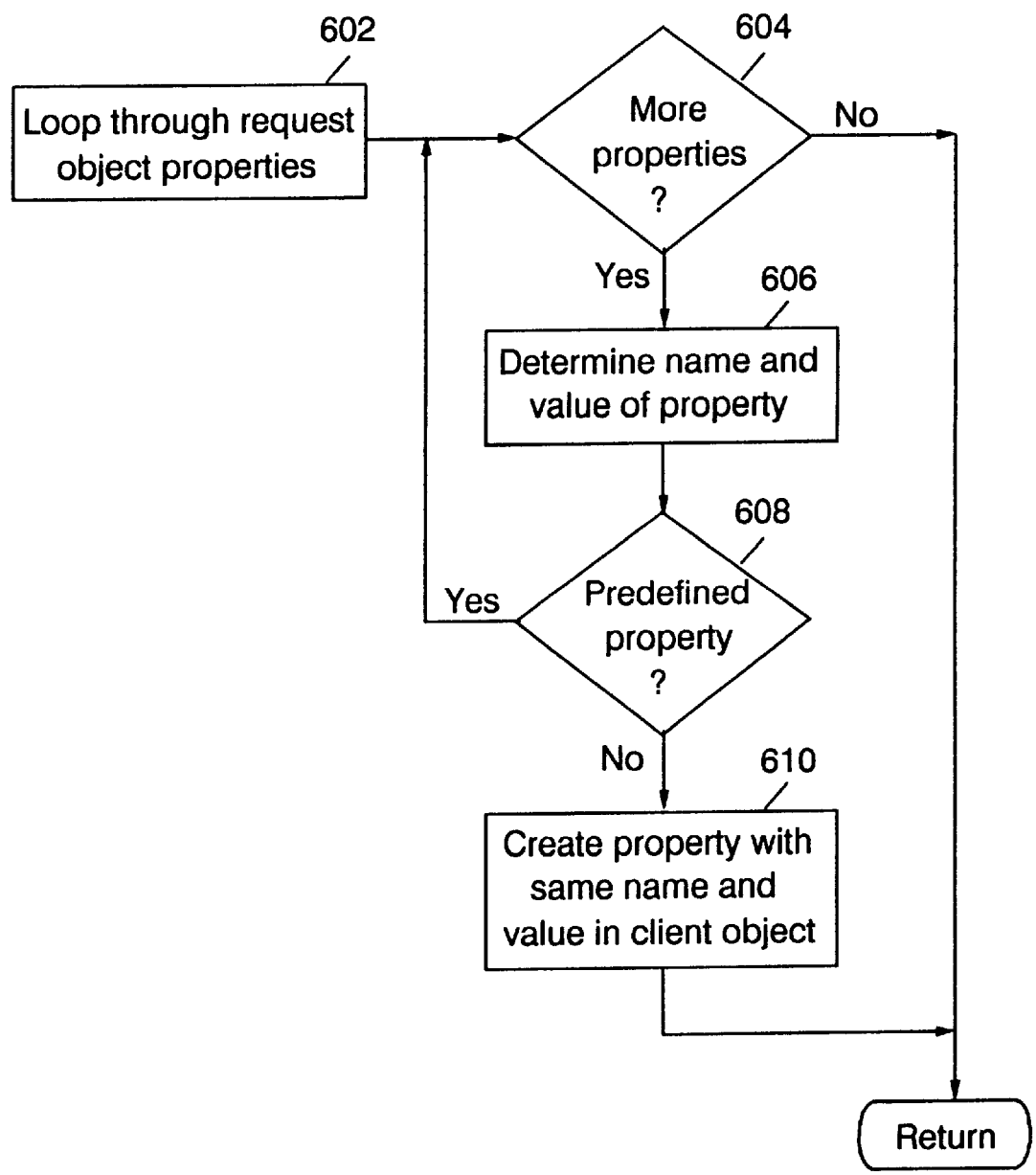
FIG. 6 illustrates, in flowchart form, a method for setting variables in accordance with one embodiment of the present invention.

FIG. 6 illustrates operation of one embodiment of the present invention in flow chart form. Refer now to FIG. 6. Assume that a user of a data processing system, such as client 112 of FIG. 1, is executing a JavaScript application retrieved from one of the plurality of web sites 110 via Internet access provider 114 or on-line service provider 116. Next, assume that client 112 uses its browser to invoke a config.html page implemented in accordance with one embodiment of the present invention, through a request having the form:

http://server.domain/application/config.html?x=2.

It should be noted that such a request is typically received by user interface adapter 222, presumably from keyboard 224. Additionally, it should be noted that alternate input interfaces may also be utilized to provide the invoking request. In another embodiment of the present invention, the invoking request may be embedded within a software program available in a memory of the data processing system.

Upon receipt of the request to provide client object information, CPU 210 parses through the request to determine which object properties should be determined (step 602). In step 604, it is ascertained if more properties are to be determined. For each object property, CPU 210 determines a name and value of the property (step 606). CPU 210 determines the name to be associated with the property using a methodology implemented by operating systems supporting JavaScript applications.

A value of the property is then determined by CPU 210 upon execution of a JavaScript statement, referred to as the "for . . . in" statement. The "for . . . in" statement in JavaScript begins with a clause that defines an initial state for a "for" loop, the condition under which the loop will terminate, and a manner in which the loop will be updated at the end of each iteration. Specifically, a "for . . in" statement may be used to define the top-level properties associated with an object specified within the "for . . . in" statement.

Subsequently, CPU 210 determines when the property specified in the request is a "predefined" property (step 608). A predefined property is any property that is typically included in a request. Such properties include an IP address, an agent, a protocol, and a method among others. If the property is predefined, a program flow of one embodiment of the present invention returns to step 604.

However, if the property is not predefined, a name and value specified in the property are created and stored within the client object (step 610). Thus, when the invoking request is input with a statement associating a name with a value after the "config.html" suffix, CPU 210 creates a property with the same name and the same value within the client object. It should be noted, that as used herein, a client object typically acts as a storage location for the application to store information about a particular client when that information is needed by the application. Thus, when the property is created with the same name and value in the client object, the new value will be utilized during execution of that JavaScript application that accesses that the client object.

The source code that implements one embodiment of the "config.html page" function of the present invention is provided below:

```
<HEAD>
    <TITLE>
        WebBank Client Object Management
    </TITLE>
    <META NAME="AUTHOR"        VALUE="IBM Corporation">
    <META NAME="APPLICATION"   VALUE="WebBank">
    <META NAME="LAST-MODIFIED" VALUE="01/29/97">
</HEAD>
<BODY>
<H1>Client Information</H1>
    <SERVER>
    Include_Constants ( );
    for (i in request) {
        if (Match(i, "ip", "agent", "method", "protocol") > 0) {
        write("<BR>"+i+"="+request[i]+"\n");
    }
    else client[i] = request[i];
    }
    write("<H2>Client Object</H2>");
    DEBUG_MODE = 1;
    DEBUG_dumpobj("client", "q");
    </SERVER>
</BODY>
</HTML>
```

The foregoing provides one example for implementing the config.html function of the present invention. It should be noted that alternate embodiments may also be utilized in the foregoing software program is not intended to be the sole embodiment of the present invention.

Debug Output Function

The present invention also implements a debugging mechanism that allows debug functions to be output to a temporary file based on a current client's Internet Protocol (IP) address, rather than to a display screen or the user's current output device. To implement this portion of the present invention, an additional variable labeled debug_output is utilized to indicate whether the information obtained during a debug procedure should be displayed on a current page or should be output to a temporary file based on the current client's IP address. This option allows a person performing a debugging operation to obtain information about errors within a software program even when printing such information during program execution is not possible.

In one embodiment of the present invention, the debug_output variable is a global variable. As a global variable, the debug_variable is visible in every function and does not have to be redefined for each function in which it is used. During operation, a client 112 or software developer may modify the debug_output variable to set it to a certain value. It should be noted that the debug_output variable may be set to a certain logic value using a request having the form:

http:/server.domain/application/config.html?debug_output=Logic Value

Thus, the debug_output variable may be set using the config.html request previously described in greater detail herein. Additionally, it should be noted that in alternate embodiments of the present invention, other techniques may be used to set the value of the debug_output variable. Such other techniques include hard coding the value of the variable directly in the software program and reading the variable value from a file that is accessed when the software program is executed.

Once set to a logic value determined by a user or software developer, the logic value of the debug_output variable may be used to indicate that the debug information should be displayed on a current page. Additionally, the debug_output variable may be set to specify that the debug information should be output to a temporary file. The temporary file may be stored in a location based on the current client's IP address or stored within a valid path name for a file that has been previously defined. It should be noted that the debug_output value may also be set to logic values that correspond to specific storage devices.

Figure 3:
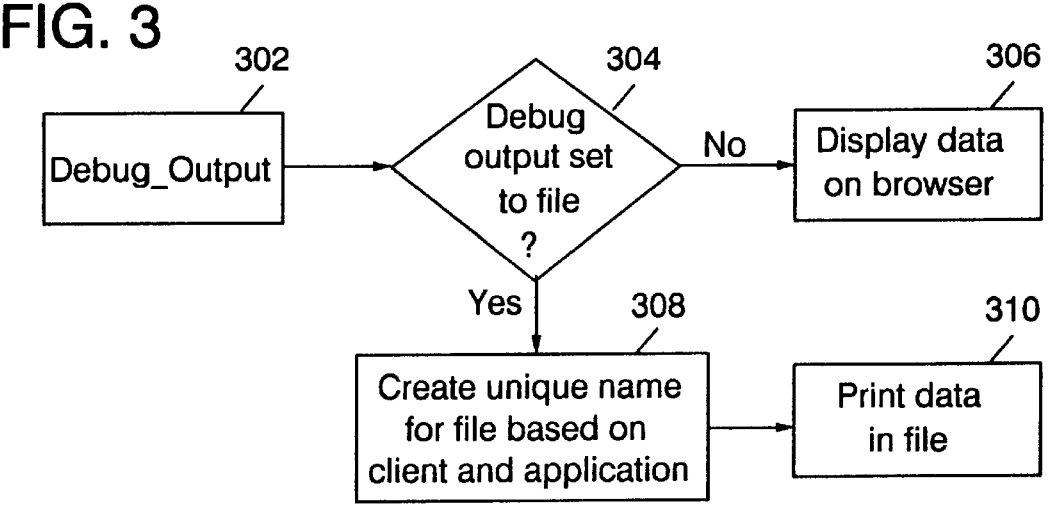
FIG. 3 illustrates, in flowchart form, an output methodology implemented in accordance with one embodiment of the present invention.

An implementation of one embodiment of the present invention is illustrated in FIG. 3. Assume that during operation, a JavaScript software program is debugged using techniques that output information about the debugging steps to a user or software developer. The control signals to output the debugging information may be generated by CPU 210 in one embodiment of the present invention. Thus, upon the detection of an output event (step 302), CPU 210 determines a logic state or value corresponding to the debug_output variable (step 304). If the debug_output variable is set to a first logic level that indicates that the debug information should be provided to the user or software developer, CPU 210 generates the appropriate control and data signals to enable display device 238 to display the data using techniques implemented by a browser (step 306).

Alternatively, if CPU 210 determines that the debug_output variable is set to a logic state that indicates that the data should not be displayed on a display device of the user or software developer, a step 308 is executed. In step 308, CPU 210, under the control of the browser implemented by the client, creates a unique name for a file based on the client JavaScript application. The file is then used to store debugging information so that the information may be later accessed by the client or a software developer. In creating the unique name for the file, CPU 210 may create a temporary file based on a current client's IP address. Such a temporary file may be accessed by a URL with the suffix "/tmp/9.123.23.45," where the client's IP address is 9.123.23.45. Alternatively, a file name having a predefined name may also be used at all times. Subsequently, in step 310, the data obtained from executing a debugging function is stored within a file that may be accessed later by the user or software developer through a file request operation.

The foregoing provides one example for implementing the debug_output variable of the present invention. It should be noted that alternate embodiments may also be utilized and the foregoing description is not intended to be the sole embodiment of the present invention.

Debug Start and Debug End

The present invention also implements a mechanism for selectively enabling and disabling debug statements in software code. By providing such selective enablement, the use of debugging statements in the software code may be selectively enabled and disabled without modifying previously compiled code. Specifically, the present invention implements a debug_start and debug_end statement to define debugging functions in JavaScript software code.

The debug_start call indicates a beginning of a named debugging section. Upon receipt of a debug_start call, a debug_mode variable is set to a desired level. The debug mode variable determines a level of debug with which the user may perform program correction functions. It should be noted that the debug_mode variable is stored in a memory location, such as RAM 214 or another internal memory not displayed in detail herein. Additionally, it should be noted that when the debug mode variable is not set to a specified level, the debug mode variable is set to a default value. The debug_mode variable is determined by a section of a program in which the debug start and debug_end statements are implemented. When a section of a program to be evaluated is enabled, all debug statements within the section whose level is less than or equal to that of the section will be enabled. As well, sections associated with the debug_start and debug_end statements may be enabled by setting variables in the client object associated with the client's computer. By using the client object, several users may simultaneously use the same application with the debugging instructions enabled or disabled on an individual basis. In one embodiment of the present invention, a config.html request may be used to enable the sections.

Just as a debug_start call marks the beginning of a named debugging section, a debug_end call restores the debug_mode variable to its value before the section was entered. It should be noted that any method may be used to set the debug_mode value, but the debug_mode value may also be set using the config.html page methodology previously described herein.

An example of usage and a sample software code that utilizes the debug_start and debug_end calls will be provided below.

Usage:
DEBUG_start (section [, level]);
DEBUG_end (section);
Example
DEBUG_dumpobj ("myobj"); //1
. . .
DEBUG_start ("SECTION-1", 1); //2
. . .
DEBUG_show (0, "a"); /3

DEBUG_dumpobj ("myobj"); //4
. . .
DEBUG_end ("SECTION-1"); //5

As may be observed from the usage of the debug_start and debug_end calls, a section to be enabled for debugging and disabled is specified as an argument within the call (e.g., SECTION-1). Additionally, in the debug start call, a level of debug that corresponds to a value of the debugjmode variable is also specified. Thus, in the example provided above, the debug start call enables debug for SECTION-1 and sets the debug_mode variable equal to a "1". In one embodiment of the present invention, when the debug_mode variable is set to a "1" only the debug_dumpobj function is enabled for execution. Furthermore, the section-1 is only enabled for debugging when a client.DEBUG_SECTION-1 is set to "true." When the client.DEBUG_SECTION-1 object is set to false, no debugging statements are executed. However, if the client.DEBUG_SECTION-1 object is set to true and the corresponding section is enabled with a debug_start call, the section is executed. In the foregoing example, statement (1) is not executed as it is outside of the enabled section. Additionally, statement (3) is not executed as only debug_dumpobj functions are enabled when the debug_mode variable is set to a 1. However, statement (4) is executed as it is both within an enabled section and is a debugging function that is allowed by the debug_mode variable. After statement (5) is executed, the debug_mode variable is again set to 0 in response to execution of the debug_end function.

It should be noted that debut start and debug end calls may be nested. Within each section specified by a debut start and debug end statement, the debug mode variable may be modified for that section. Upon movement from that section to a previously enabled section, the debug mode variable will return a value specified by the previous debug_start function. Furthermore, it should be noted that in one embodiment to the present invention, the scope of the sections identified by the debug_start and debug_end calls is local to a page, even while a scope of an enabled section is global to the system.

Figure 4:
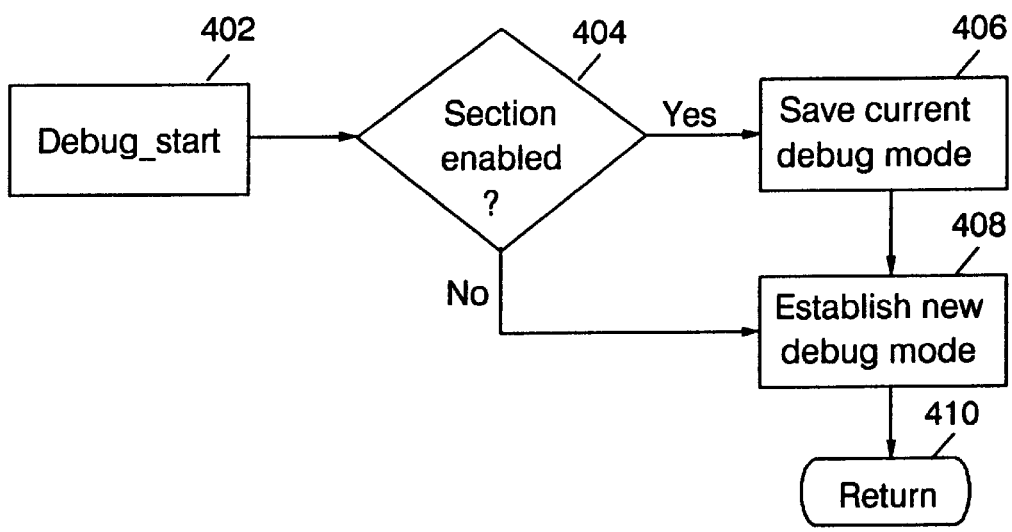
FIG. 4 illustrates, in flowchart form, a first debugging methodology implemented in accordance with one embodiment of the present invention.
Figure 5:
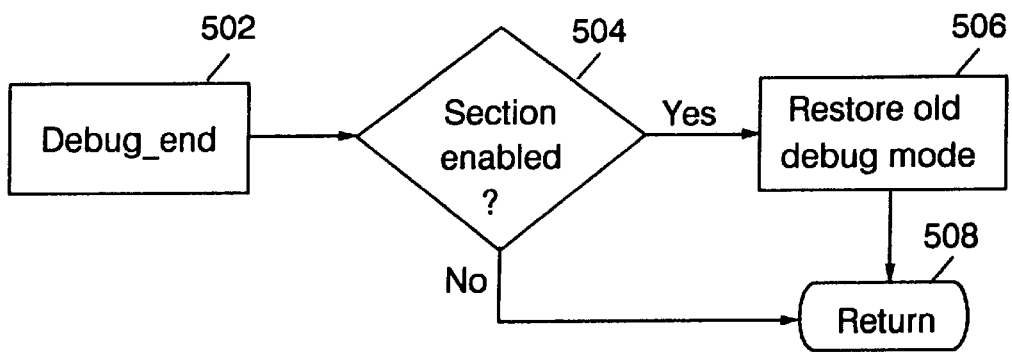
FIG. 5 illustrates, in flowchart form, a second debugging methodology implemented in accordance with one embodiment of the present invention.

FIGS. 4 and 5 provide flowcharts illustrating a methodology for implementing the debug_start and debug end calls, respectively. Refer now to FIG. 4. In a first step 402, a debug_start call is inserted within a JavaScript program to be debugged. The programmer may then execute the debug_start function by retrieving, interpreting, and executing the JavaScript program. Retrieval, interpretation, and execution of a JavaScript program are well-known to those with skill in the data processing art and, therefore, will not be described in greater detail herein. Thus, in step 402, a debug_start function is received by user interface adapter 222, presumably from keyboard 224. It should be noted that alternate input interfaces may also be utilized to provide the debug_start function. In one embodiment of the present invention, the debug_start function may be included within a program stored on disk drive 220.

Upon receipt of the debug_start function, CPU 210 determines whether the section specified in the debug_start function is enabled in a step 404. If that section is enabled, a step 406 is executed and a current debug mode variable is saved in a memory, such as RAM 214 or another memory within data processing system 200 of FIG. 2. Then, a new debug mode of operation having new parameters is implemented by CPU 210 in a step 408. A program flow subsequently returns to the debugging steps set forth within the executing code in a step 410. Furthermore, it should be noted that if the section is not enabled in the determination made in step 404, step 408 is subsequently executed.

The debug_start function may be implemented using the following software code in one embodiment of the invention.

```
// Function: DEBUG_start (section_name, [level])
//
// Sets DEBUG_MODE to desired level (default is DEBUG_MAX_LVL) when
// client.DEBUG_<section_name> is true. Should be paired with debug_end,
// which will restore DEBUG_MODE to a previous value.
//
function debug_start (section, level) {
    if (debug_start.arguments.length < 1) return;
    var 1=DEBUG_MAX_LVL;
    if (debug_start.arguments.length > 1) I = level;
    if (client["DEBUG_"+section]=="true") (
        client["LVLB_"+section] = DEBUG_MODE;
        DEBUG_MODE = I;
        write("<BR><HR><B>DEBUG: Start section "+section+"</B><HR>");
    }
}
```

40

The foregoing provides one example for implementing the debug_start function of the present invention. It should be noted that alternate embodiments may also be utilized and the foregoing program is not intended to be the sole embodiment of the present invention. Additionally, the foregoing example illustrates a series of debug instructions. It should be noted that some of the debug instructions used therein are described in greater detail in the previously cross-referenced patent application entitled "A Data Processing System and Method for Debugging JavaScript" by Richard D. Hoffman which was previously incorporated by reference herein.

Each enabled debugging section begins with a debug_start call and should end with a debug_end call. FIG. 5 illustrates a flow chart for implementing the functionality associated with the debug_end function examples provided above. In FIG. 5, a debug_end function is received by user interface adapter 222, presumably from keyboard 224. It should be noted that alternate input interfaces may also be utilized to provide the debug_end function. In one embodiment of the present invention, the debug_end function may be included within a program stored on disk drive 120.

Upon receipt of the debug_end function, step 502, CPU 210 evaluates a section specified in the debug_end call to determine whether the section is enabled with the appropriate debug start call in a step 504. If CPU 210 determines that the specified section is enabled, a debug_mode variable associated with the code executing before the previous debug_start call was made is retrieved from a memory, such as RAM 214 or another memory within data processing system 200 of FIG. 2. After restoration of the previous debug_mode variable value, step 506, a program flow returns to the code executing after the debug end call in a step 508. Additionally, if a result of step 504 indicates that the section cited in the debug_end call is not enabled, step 508 is executed.

The debug_end function may be implemented using the following software code in one embodiment of the invention.

```
// Function: debug_end (section_name)
//
// Restores DEBUG_MODE to its value before the start of the current debug
// section.
//
function DEBUG_end (section) {
    if (DEBUG_end.arguments.length < 1) return;
    if (client["DEBUG_"+section]=="true") {
        DEBUG_MODE = parseInt(client["LVLB_"+section], 10);
        write("<BR><HR><B>DEBUG: End section "+section+"</B><HR>");
    }
}
```

The foregoing provides one example for implementing the debug_end function of the present invention. It should be noted that alternate embodiments may also be utilized and the foregoing software program is not intended to be the sole embodiment to the present invention.

It should be noted that the description provided herein is but one example of an implementation of the present invention. It should be noted that many additional implementations may also be utilized to realize the present invention. While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A computer program product in a computer-readable medium for debugging a software program, comprising:

means for receiving a request in a first format, wherein the request identifies a uniform resource locator of a client implementing the software program;

means for retrieving a first characteristic of the client in response to the request;

means for displaying the first characteristic of the client;

means for accessing an object of the client, wherein the object has a first variable having a first value; and means for modifying the first variable to have a second value, wherein the request identifies the first variable and the second value.

2. A method for debugging a program written in a object-oriented programming language and implemented by a user, comprising the steps of:

accessing an object of the program using a first request protocol, wherein the first request protocol specifies a uniform resource locator;

retrieving a first characteristic of the object in response to the first request protocol;

providing the first characteristic of the object to the user; and modifing a value of a variable of the object to the program in response to the first request protocol, wherein the first request protocol has a format:

http://UniformResourceLocator/config.html?variable=value, wherein UniformResourceLocator corresponds to the uniform resource locator, variable corresponds to the variable of the object, and value corresponds to a modified value of the variable of the object.

3. A computer program product in a computer-readable medium for debugging a software program, comprising:

means for receiving a request in a first format, wherein the request identifies a uniform resource locator of a client implementing the software program;

means for retrieving a first characteristic of the client in response to the request;

means for displaying the first characteristic of the client;

means for accessing an object of the client wherein the object has a first variable having a first value; and means for modifying the first variable to have a second value, wherein the first request has a format:

http://UniformResourceLocator/config.html?variable=value, wherein "UniformResourceLocator" corresponds to the uniform resource locator of the client, "variable" corresponds to the first variable, and "value" corresponds to the second value.

4. A first data processing system comprising:

input means for receiving a request in a first format, wherein the request identifies a uniform resource locator of a second data processing system; and a central processing unit for parsing the request to determine a property of the second data processing system and for selectively modifying a value of a variable in a software program accessible by the second data processing system, wherein the central processing unit determines when the property of the second data processing system is an unpredefined property, and wherein the central processing unit selectively modifies the value of the variable in the software program when the property of the second data processing system is the unpredefined property.

5. A method for executing a software program, comprising the steps of:

retrieving an output variable from a first memory;

executing the software program to generate an output;

selectively storing the output in a second memory when the output variable has a first value and selectively displaying the output on a display device when the output variable has a second value; and generating a temporary file using an Internet Protocol address corresponding to the second memory, wherein the output is stored in the temporary file when the output variable has the first value.

6. The method of claim 5, further comprising the step of: accessing the output from the temporary file using a uniform resource locator.

7. The method of claim 5, wherein the software program is a debugging program.

8. A computer program product in a computer readable medium for debugging a software program, comprising:

means for retrieving an output variable from a first memory;

means for executing the software program to generate an output;

means for selectively storing the output in a second memory when the output variable has a first value;

means for selectively displaying the output on a display device when the output variable has a second value; and means for generating a temporary file using an Internet Protocol address corresponding to the second memory, wherein the output is stored int he temporary file when the output variable has the first value.

9. The computer program product of claim 8, further comprising:

means for accessing the output from the temporary file using a uniform resource locator.

10. A data processing system for executing a software program, comprising:

a first memory for storing an output variable;

a central processing unit coupled to the first memory for retrieving the output variable and for executing the software program to generate an output;

a second memory for selectively storing the output when the output variable has a first value, the second memory being coupled to the central processing unit for selectively receiving the output;

a display device for selectively displaying the output when the output variable has a second value, the display device being coupled to the central processing unit for selectively receiving the output; and means for generating a temporary file using an Internet Protocol address corresponding to the second memory, wherein the output is stored in the temporary file when the output variable has the first value.

11. The data processing system of claim 10, further comprising:

means for accessing the output from the temporary file using a uniform resource locator.

* * * * *